United States Patent
Tetil

(10) Patent No.: US 9,939,305 B2
(45) Date of Patent: Apr. 10, 2018

(54) LEVEL SENDER WITH SENSORS

(71) Applicant: TI Group Automotive Systems, L.L.C., Auburn Hills, MI (US)

(72) Inventor: Garrett M. Tetil, Vassar, MI (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 113 days.

(21) Appl. No.: 15/046,812

(22) Filed: Feb. 18, 2016

(65) Prior Publication Data

US 2016/0238426 A1  Aug. 18, 2016

Related U.S. Application Data

(60) Provisional application No. 62/117,658, filed on Feb. 18, 2015.

(51) Int. Cl.
*G01F 23/00* (2006.01)
*G01F 23/36* (2006.01)
*G01F 23/14* (2006.01)

(52) U.S. Cl.
CPC ...... *G01F 23/0038* (2013.01); *G01F 23/0069* (2013.01); *G01F 23/14* (2013.01); *G01F 23/36* (2013.01); *G01F 23/0076* (2013.01)

(58) Field of Classification Search
CPC .. G01F 23/0038; G01F 23/0069; G01F 23/14; G01F 23/36; G01F 23/0076
See application file for complete search history.

(56) References Cited

U.S. PATENT DOCUMENTS

| | | | |
|---|---|---|---|
| 2,455,200 A | 11/1948 | Wallace | |
| 3,114,381 A * | 12/1963 | Klose | F17C 13/021 137/101.25 |
| 3,987,675 A * | 10/1976 | Harrison | G01F 23/167 73/302 |

(Continued)

FOREIGN PATENT DOCUMENTS

| DE | 196 38 476 A1 | 4/1997 |
|---|---|---|
| GB | 2 102 954 A | 2/1983 |

OTHER PUBLICATIONS

International Search Report for International Application No. PCT/US2016/018416, dated Jul. 14, 2016.

(Continued)

*Primary Examiner* — Lisa Caputo
*Assistant Examiner* — Nathaniel T Woodward
(74) *Attorney, Agent, or Firm* — Brinks Gilson & Lione

(57) ABSTRACT

A level sender for a tank includes a sensor device. The sensor device includes a primary pressure sensor, a reference pressure sensor, and a correction pressure sensor. A primary tube at least partially encloses the primary pressure sensor and extends from an upper region of the tank to a lower region of the tank. A reference tube at least partially encloses the reference pressure sensor and extends from the upper region to the lower region. A correction tube at least partially encloses the correction pressure sensor. The correction tube at least partially enclose the correction pressure sensor in the upper region. The sensor device further includes a processor coupled to the primary, reference, and correction pressure sensors to determine a level of liquid within the tank based on pressure measurements within the primary, reference, and correction tubes.

18 Claims, 4 Drawing Sheets

(56) References Cited

U.S. PATENT DOCUMENTS

| | | | |
|---|---|---|---|
| 4,291,575 A | 9/1981 | Frissora | |
| 4,409,833 A | 10/1983 | Thomson et al. | |
| 4,570,484 A * | 2/1986 | Sokalski | G01F 23/14 |
| | | | 137/392 |
| 4,630,478 A | 12/1986 | Johnson | |
| 5,146,783 A * | 9/1992 | Jansche | G01F 23/168 |
| | | | 73/301 |
| 5,309,764 A * | 5/1994 | Waldrop | G01F 23/168 |
| | | | 73/302 |
| 5,671,603 A * | 9/1997 | McCorkle | F17C 13/021 |
| | | | 137/392 |
| 5,791,187 A * | 8/1998 | Chang | G01C 13/008 |
| | | | 73/290 R |
| 6,109,113 A * | 8/2000 | Chavan | B81B 7/007 |
| | | | 73/706 |
| 6,298,721 B1 | 10/2001 | Schuppe et al. | |
| 6,843,116 B2 | 1/2005 | Mitani et al. | |
| 6,907,780 B1 | 6/2005 | Meagher | |
| 7,251,998 B2 | 8/2007 | Gourlay et al. | |
| 7,658,104 B2 | 2/2010 | Hewitt | |
| 7,895,890 B2 | 3/2011 | Van Ee | |
| 8,261,618 B2 | 9/2012 | Engle et al. | |
| 2011/0000295 A1* | 1/2011 | Kritlow | G01F 23/18 |
| | | | 73/299 |
| 2012/0325022 A1 | 12/2012 | Shanebrook et al. | |

OTHER PUBLICATIONS

InvenSense Inc., *MPU-6000 and MPU-6050 Product Specification Revision 3.4, Release Date Aug. 19, 2013*, 52 pgs.
International Preliminary Report on Patentability, International Application No. PCT/US2016/018416, dated Aug. 31, 2017, 7 pages.

\* cited by examiner

LEVEL SENDER WITH SENSORS

CROSS REFERENCE TO RELATED APPLICATIONS

This application claims the benefit of U.S. Provisional Patent Application Ser. No. 62/117,658, filed Feb. 18, 2015, entitled "Level Sender," the content of which is hereby incorporated by reference in its entirety.

TECHNICAL FIELD

The present disclosure relates to a device for monitoring the level of a liquid within a tank.

BACKGROUND

Fuel tanks may be used to retain a supply of liquid fuel in a fuel system. Such fuel systems may be used, for example, in automotive applications to deliver fuel for combustion within an engine. A level sender may be used to monitor and provide a signal indicative of the level of fuel in the fuel tank. The tank and level sender may be used with fluids other than fuel and in applications other than vehicle fuel systems. Further improvements in level senders and for determining a level of fluid within a tank are desirable.

SUMMARY

In an exemplary embodiment, a level sender for a tank includes a sensor device. The sensor device includes a primary pressure sensor, a reference pressure sensor, and a correction pressure sensor. A primary tube at least partially encloses the primary pressure sensor and is configured to extend from an upper region of the tank to a lower region of the tank. A reference tube at least partially encloses the reference pressure sensor and is configured to extend from the upper region to the lower region. A correction tube at least partially encloses the correction pressure sensor. The correction tube is configured to at least partially enclose the correction pressure sensor in the upper region of the tank. The sensor device further includes a processor that is coupled to the primary, reference, and correction pressure sensors and is configured to determine a level of liquid within the tank based on pressure measurements within the primary, reference, and correction tubes.

In another exemplary embodiment, an apparatus for carrying liquid is provided. The apparatus includes a tank for carrying the liquid. A level sender is operatively coupled to the tank. The level sender includes a sensor device. The sensor device includes a primary pressure sensor, a reference pressure sensor, and a correction pressure sensor. A primary tube at least partially encloses the primary pressure sensor and extends from an upper region of the tank to a lower region of the tank. A reference tube at least partially encloses the reference pressure sensor and extends from the upper region to the lower region. A correction tube at least partially encloses the correction pressure sensor in the upper region of the tank. The sensor device further includes a processor that is coupled to the primary, reference, and correction pressure sensors and that is configured to determine a level of liquid within the tank based on pressure measurements within the primary, reference, and correction tubes.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
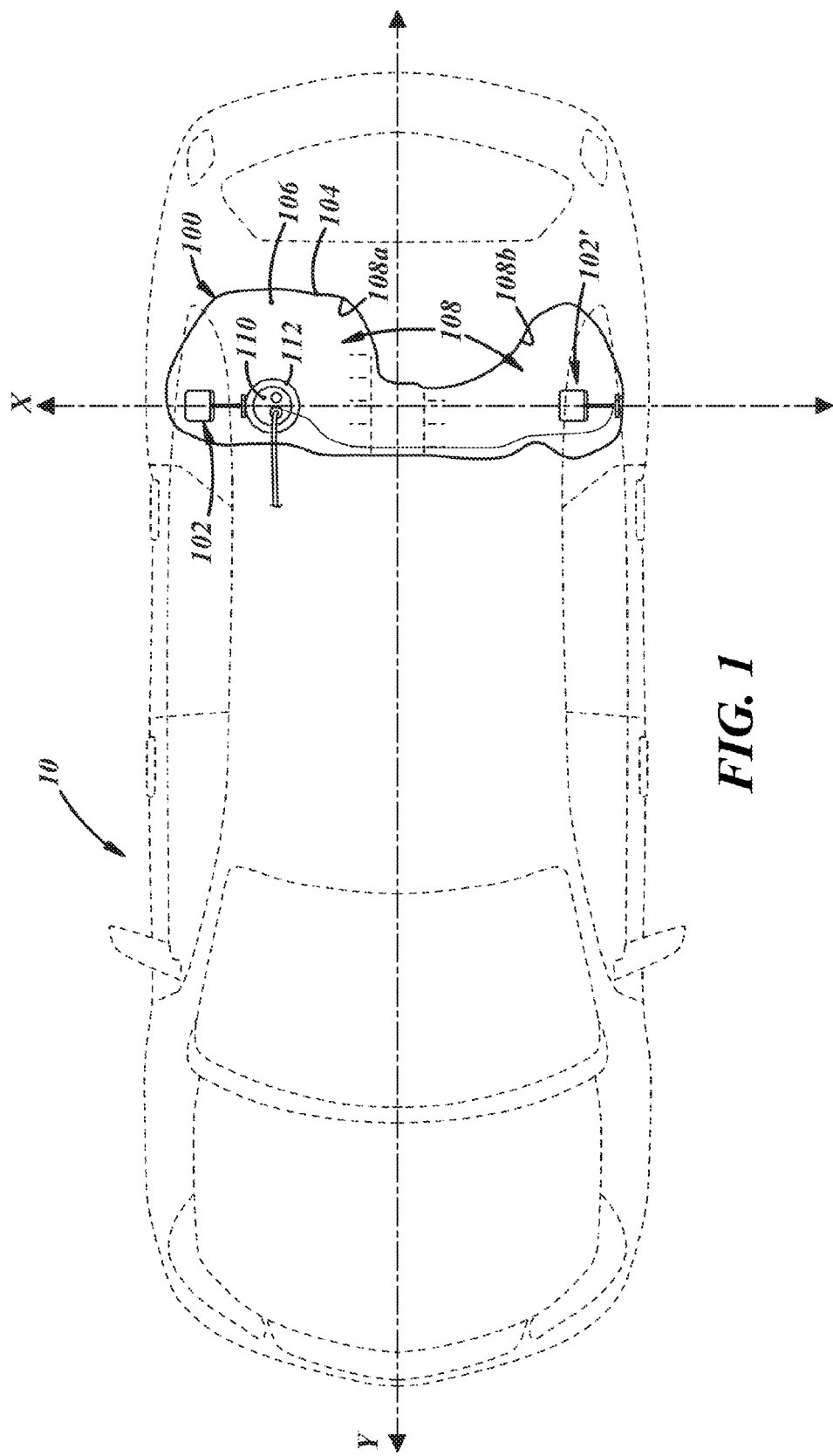
FIG. 1 is a top view of a vehicle (shown in phantom) and a fuel tank in section to show a fuel pump module and a level sender.

Referring in more detail to the drawings, FIG. 1 illustrates a vehicle 10 having a tank 100, such as a fuel tank that may be used to retain a supply of liquid fuel in a fuel system, and a level sender 102 associated with the tank 100. Such fuel systems may be used, for example, in automotive applications to deliver fuel for combustion within an engine. The level sender 102 may be used to monitor and provide a signal indicative of the level of liquid (fuel) in the tank 100. Of course, the tank 100 and level sender 102 may be used with liquids other than fuel and in applications other than vehicle fuel systems.

The fuel tank 100 may include one or more walls 104 defining an internal volume 106 in which the liquid is contained. The fuel tank wall(s) 104 may be formed of any suitable metal or non-metallic material. In one form, the fuel tank 100 may be formed from several layers of polymeric materials, in a so called "multi-layer" fuel tank (e.g., inner and outer layers, one of more adhesive layers, and one or more barrier layers). Alternatively, the tank 100 could be formed from a single material, or could have layers in addition to or other than those specifically noted herein.

Tank 100 may have one or more compartments 108. For example, in the illustrated implementation, the tank 108 includes two compartments 108 where a first compartment 108a is a main-side compartment (e.g., containing a fuel pump module including a fuel pump 110, a reservoir 112, etc.) and a second compartment 108b is a sub-side compartment—and this type of tank 100 is commonly referred to as a saddle tank design. In saddle tank designs, the first and second compartments 108a, 108b are in fluid communication with one another in an upper region of the tank 100 and might not be in fluid communication in a lower region of the tank. Of course, this is merely one example; in other examples the compartments 108 may be spaced differently from one another, separated or divided entirely, or otherwise.

Figure 2:
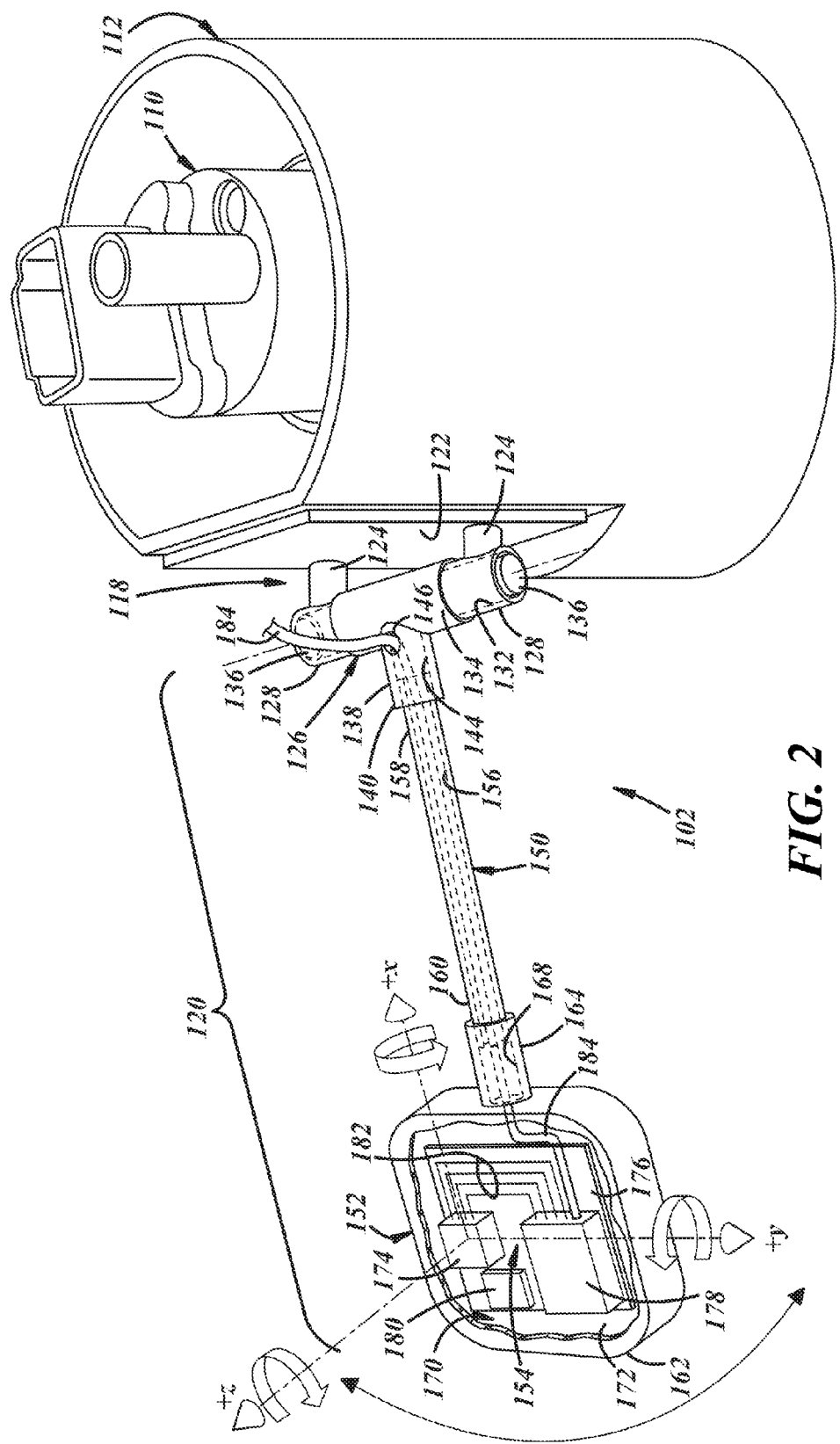
FIG. 2 is a perspective view of a portion of the fuel pump module and level sender of FIG. 1.

As best shown in FIG. 2, level sender 102 comprises a mount 118 and a sensing feature 120 coupled to the mount. The mount 118 may be suitable for connecting or coupling to the reservoir 112. This however is merely an example; the mount 118 alternatively could be coupled to the tank wall 104, the fuel pump 110, or other fuel tank components (not shown).

Mount 118 comprises a base 122, two posts 124, and a hinge 126, according to one embodiment. The illustrated base 122 is a planar structure; however, this is merely an example. Base 122 may have any suitable shape and may have features for fastening to the reservoir 112. The two posts 124 extend outwardly away from the base 122 and carry the hinge 126. The hinge 126 comprises two sleeves 128, one sleeve 128 is located at and connected to a distal end of each of the posts 124. In addition, the two sleeves 128 are axially aligned with one another and a rod 132 extends through and between the sleeves 128. The rod 132 has a larger diameter in a middle portion 134 that is received between and reduces axial movement or play between the sleeves 128. The ends 136 of the rod 132 are sized to freely rotate or spin about an axis within each of the sleeves 128. In this way, the hinge 126 rotates relative to the sleeves 128, posts 124 and base 122. A hollow connector 138 may extend radially outwardly from the middle portion 134 of the rod 132 to carry the sensing feature 120 (e.g., here, the rod 132 and connector 138 form a T-shape). A distal end 140 of the connector 138 may have an opening to a passage 144 that extends longitudinally through the connector. And an opening 146 in the connector 138 may be in communication with the opening via the passage 144. The connector could instead be a cavity in the middle portion 134 of the rod 132, and the opening could be provided in the rod 132, open to the opening.

In at least some implementations, sensing feature 120 comprises a rigid float arm 150, a float 152 coupled to the float arm, and a sensor device 154 carried by the float. The float arm 150 may be a hollow tube having a passage 156 extending from a first end 158 to an opposing second end 160. According to the illustrated implementation, the first end 158 is sized to be press-fit or otherwise secured within the passage 144 of the connector 138. The second end 160 of the float arm is coupled to the float 152. The float arm 150 can be straight (as shown), or it may be angled or curved to accommodate the shape of the tank 100 and/or the location of the level sender 102—thus enabling a fuller range of motion of the sensing feature 120 in accordance with changes in the level of the liquid in the tank 100. The float arm 150 may be comprised of any suitable material for use in contact with the fluids in the tank 100.

Float 152 may be a body that defines at least part of an enclosure and may be formed of any suitable material that is at least somewhat buoyant in the liquid within the tank, and may be adapted to float on the surface of the liquid contained within the tank 100. The float 152 may include a body 162 having a connector 164 coupled to and extending from one side of the body 162. The connector 164 comprises a passage 168 sized to receive the second end 160 of the float arm 150 in a press-fit or other suitable attachment means, such as but not limited to, adhesive, mechanical fastener, weld, heat staking, or the like.

The float body 162 may be any suitable shape; FIG. 2 shows an example where the body 162 is generally rectangular. Other shapes are also possible. According to one embodiment, the body 162 includes a hollow region 170 defining an interior volume 172; the hollow region 170 is adapted to carry sensor device 154. Further, hollow region 170 and connector passage 168 are in communication with one another.

Sensor device 154 may include any suitable inertial-motion sensor 174 which may be used to measure changes in a position of the float 152 as the surface level of liquid in the tank 100 changes. According to one implementation, the inertial-motion sensor 174 is a micro-electro-mechanical system (or MEMS) device fixed to a printed circuit board (PCB) 176 or the like. In at least some implementations, sensor 174 includes an embedded acceleration sensor and an embedded gyroscopic sensor for measuring acceleration and orientation (or attitude), respectively, in at least one common axis (e.g., an axis x). The inertial-motion sensor 174 also could be capable of measuring acceleration and orientation using two or three axes (e.g., axes x, y, and/or z)—regardless of whether all the axes are used to determine the level of the liquid in the tank 100. In at least one embodiment, the sensor 174 may be oriented in the vehicle 10 so that one axis of sensor 174 (e.g., the x-axis) is within or parallel to a plane X (shown in FIG. 1); the advantages of such alignment are discussed in greater detail below.

One commercially available three-axis accelerometer/three-axis gyroscope is the MPU 60X0 by InvenSense™. In the MPU 60X0, each axis of the accelerometer is coincident with one of the axes of the gyroscope. Further, the sensor 174 may have a serial data interface for accelerometer and gyroscope data, as well as a power interface to power the sensor.

In some embodiments, sensor device 154 may further include a processor or processing device 178 and memory 180, each of which may be mounted on or communicated with the PCB 176. Thus, the processor 178 and memory 180 may be carried by the float 152 (e.g., within the hollow region 170) and may be electrically coupled to the sensor 174 (e.g., to the serial data and power interfaces).

Processor 178 should be construed broadly to include any type of device capable of processing electronic instructions including microprocessors, microcontrollers, vehicle communication processors, and application specific integrated circuits (ASICs). In one embodiment, processor 178 is a microprocessor. Thus, the processor 178 may execute various types of digitally-stored instructions, such as software or firmware programs stored on memory 180. And in at least one implementation, processor 178 is configured to execute program(s) and process data to carry out at least part of the method discussed herein.

Memory 180 also should be construed broadly to include any suitable non-transitory computer usable or readable medium. Exemplary computer usable storage mediums include RAM (Random Access Memory), ROM (Read Only Memory), EPROM (Erasable, Programmable ROM), EEPROM (Electrically Erasable, Programmable ROM), just to name a few examples.

It should be appreciated that not all implementations require memory 180. And in some implementations, the sensor device 154 does not include processor 178. For example, the processor 178 may be located elsewhere in the vehicle 10 and/or part of another device or vehicle system. Just to list a few non-limiting examples, the processor 178 could be located on (and sealed within) the base 122 of the mount 118, on the fuel pump 110 (e.g., and may or may not be the same as a motor control unit (not shown) for the fuel pump 110), on a tank flange (not shown) associated with the fuel pump 110, in a fuel system electronic control unit (not shown) outside of the tank 100, etc.

In some implementations, communication between the sensor 174 and processor 178 may be over wires or traces 182 (on PCB 176) using protocols such as I²C (Inter-Integrated Circuit) or SPI (Serial-Peripheral Interface). And a wire, wiring harness or bus 184 is shown electrically coupled to processor 178 and extending through the connector passage 168 of the float 152, the float arm passage 156 and the connector passage 144, and exiting the connector 138 via the through-hole 146. From there, harness 184 may continue to a downstream controller (e.g., an electronic control unit or ECU) or fuel gauge electronics (not shown). Examples of communication protocols over harness 184 between the processor 178 and such an ECU include CAN (Controller Access Network) or PWM (Pulse Width Modulation). All protocols (I²C, SPI, CAN, PWM) are provided by way of example only; other protocols can be used.

During use, sensing feature 120 pivots at hinge 126 as the level of fuel in tank 100 changes. For example, the rod 132 axially rotates within the sleeves 128 of the mount 118 as the float 152 is carried upwardly or downwardly by the fuel in the tank 100. In one embodiment, float 152 moves along an arcuate path within plane X (see FIG. 1) defined by the float arm 150 as it pivots at the hinge 126. Along this arcuate path, the inertial-motion sensor 174 in float 152 experiences varying degrees of tilt. Namely, the y-axis of sensor 174 is translated—remaining parallel to the Y plane, and the orientation of the x-axis changes. To better illustrate, consider the x- and y-axes at a nominal position (e.g., generally level or horizontal with respect to the terrain beneath vehicle 10). As the float 152 moves upwardly, the +x-axis of the sensor 174 is re-oriented more downwardly (again, e.g., within plane X). Likewise, from the nominal position, as the float 152 moves downwardly, the +x-axis of the sensor 174 is re-oriented more upwardly within plane X. Thus, the inertial-motion sensor 174 tilts with respect to the pivoting motion of the float 152. Describing this tilt differently—where roll is associated with the x-axis, pitch is associated with the y-axis, and yaw is associated with the z-axis—in the movements from the nominal position, as the float moves upwardly, the +y-axis experiences negative pitch (per the right-hand-rule); and as the float moves downwardly from the nominal position, the +y-axis experiences positive pitch. Each of these degrees of tilt—e.g., the increments of pitch of the y-axis—can be correlated to a surface level of fuel in the tank 100. In part, these correlations will depend on the shape and volume of the specific tank and may be calibrated at a time of manufacture and stored in memory 180 (e.g., these may include predetermined coefficients associated with one or more calculations and/or use of a look-up table).

Among other things, the processor 178 may be configured to receive single-axis acceleration data and gyroscopic data of the inertial-motion sensor 174 (e.g., data associated with the pitch of the y-axis) and determine a tilt value based on that data. The processor 178 may determine the tilt value by executing pre-configured application software stored on memory 180. One commercial example of tilt-determination software is provided by CoreMotion™. While this software is used in association with Smart phones and other mobile computing devices, this software or other suitably similar software may be stored and executed to carry out the level detection method herein. Other techniques and calculations for determining tilt using acceleration data and gyroscopic data of a single, common axis of the inertial-motion sensor 174 will be appreciated by skilled artisans.

Thus, during use, after a tilt value is determined using the acceleration and gyroscopic data, processor 178 may provide a signal indicative of the level of fuel in the tank 100 to a downstream ECU or fuel gauge. Ultimately, a representation of the fuel remaining in the tank 100 may be provided to the user of the vehicle 10 using the signal.

Figure 3:
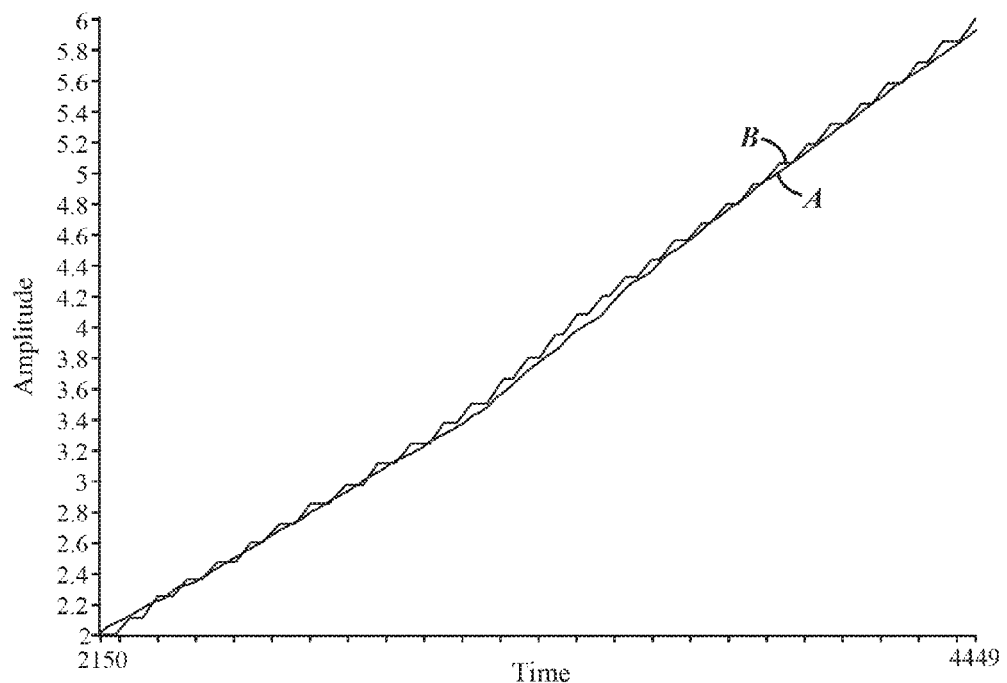
FIG. 3 is graph of test data of a conventional level sender and the level sender of FIG. 1.

FIG. 3 illustrates comparative test data between a conventional level sender (not shown) and level sender 102. The conventional level sender uses a float arm having a float at one end and a wiper at the other end. The wiper traverses a resistive array as the float moves with changing fuel levels in the tank. The graph shown in FIG. 3 shows amplitude data (vertical axis) plotted against time data (horizontal axis). During the test, both the conventional level sender and level sender 102 were located in the same empty test tank. Liquid then was provided into the test tank—thus, the surface level of the liquid gradually rose over a period of time. Electrical amplitude data of each device was recorded. First, FIG. 3 demonstrates proof-of-principle; namely, that amplitude data A of level sender 102, which uses the inertial-motion sensor 174, appropriately responds to liquid level changes within the test tank. Second, FIG. 3 demonstrates that level sender 102 may be more accurate than the conventional system. It will be observed that amplitude data B (of the conventional system) has a number of steps as the amplitude increases. These steps are caused by spaces between elements of the resistive array that are encountered as the wiper traverses the array; accordingly, spaces between the elements induce undesirable hysteresis in output B. However, output A does not step, or steps comparatively less, and consequently does not include such hysteresis-induced error, or includes much less such error. Further, since level sender 102 does not use an array of resistive elements and a wiper, there are no elements or wipers to wear-out and corrosion among or between such elements is not an issue, as in conventional systems.

According to one embodiment, level sender 102 also may be used to compensate for vehicle inclination. As shown in FIG. 1, in one embodiment, the level sender 102 is positioned in the tank 100 relative to the vehicle 10 so that the arcuate path of the float arm 150, float 152, and x-axis of the inertial-motion sensor 174 are coincident and/or parallel with a vertical plane X (a direction transverse or perpendicular to a longitudinal plane Y of the vehicle 10; i.e., plane Y extends vertically through a forwardly/rearwardly extending centerline of vehicle 10). While nothing requires this coincidence and/or parallelism with plane X, this orientation then makes the y-axis of the inertial-motion sensor 174 parallel to the longitudinal plane Y and enables the acceleration and gyroscopic data (i.e., the vehicle inclination data) associated with one axis (of sensor 174) to be readily determined and then used to cancel error in another axis.

Vehicle inclination occurs, e.g., when the front of the vehicle 10 is higher or lower than the rear of the vehicle due to changes in terrestrial terrain. When the vehicle 10 is re-oriented from a nominal orientation (e.g., on flat ground) to a decline (downhill), the +x-axis of inertial-motion sensor 174 experiences a positive roll; and when vehicle 10 is re-oriented from the nominal orientation to a incline (uphill), the +x-axis of sensor 174 experiences a negative roll. Therefore, in the embodiment of FIG. 1, pitch data (of the y-axis) may be used to determine the level of fuel in tank 100, and roll data (of the x-axis) may be used to cancel out error in the determination. Of course, this determination may include other factors such as the size of tank 100 and its shape. Thus, using a single two-axis inertial-motion sensor 174 an improved fuel level determination can be provided.

Another embodiment is shown in FIG. 1 that includes a second level sender 102'—the first level sender 102 being located in the main-side compartment 108a and the second level sender 102' being located in the sub-side compartment 108b. Using the techniques described above, the second level sender 102' may determine the level of fuel in the sub-side compartment 108b. In addition, when the level sender 102' (i.e., its inertial-motion sensor) is oriented with respect to the X- and Y-planes, x-axis tilt data of the level sender 102' may be used similarly to cancel out error in the fuel level determination (based on the y-axis tilt data). In one embodiment, the sensor device of level sender 102' does not include a processor. Instead, an inertial-motion sensor (of level sender 102') is daisy-chained with the inertial-motion sensor 174 of level sender 102 and is processed by processor 178. This reduces cost and minimizes harness size and weight—which is desirable in vehicle applications.

Figure 4:
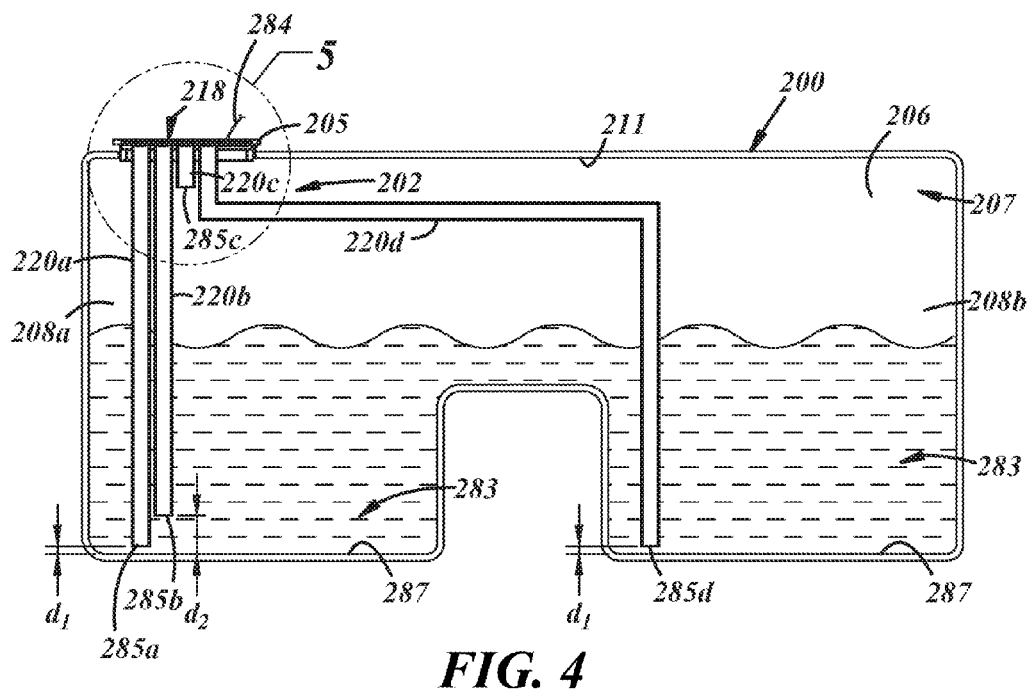
FIG. 4 is a schematic elevation view of a fuel tank and a level sender.

FIG. 4 illustrates another fuel level sending embodiment. This embodiment includes a tank 200 and a level sender 202; it will be appreciated that like reference numerals are being used to describe like or similar elements. Tank 200 has two compartments 208a, 208b (e.g., a saddle-tank design again) defining an internal volume 206; although a multi-compartment configuration is not necessary. In addition, tank 200 has one or more openings 205 in an upper region 207 (e.g., a circular through-hole in a top wall 211 of the tank). Opening 205 may receive at least a portion of the level sender 202 therethrough. Opening 205 or other openings may accommodate other fuel system components (e.g., a fuel pump, not shown).

Figure 5:
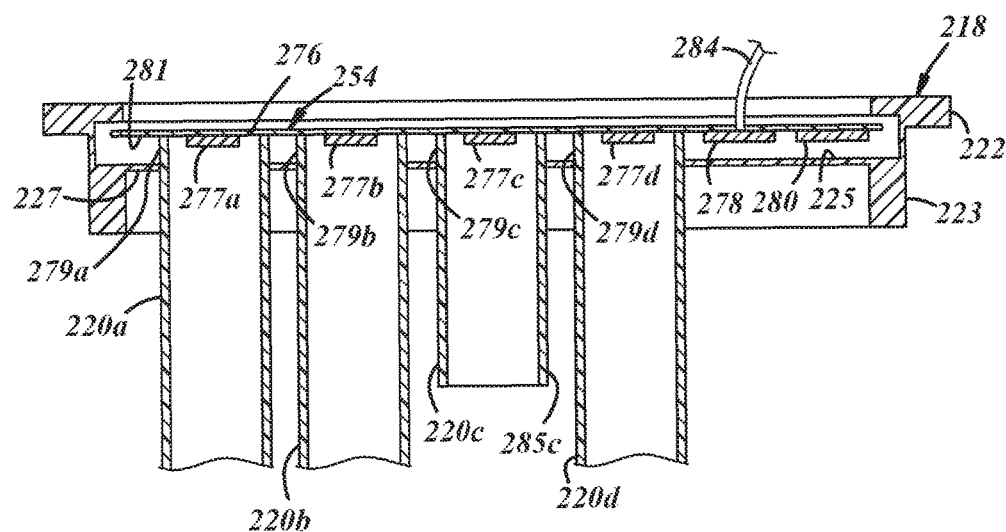
FIG. 5 is an enlarged fragmentary sectional view of a portion of FIG. 4.

Level sender 202 includes a mount or flange 218 and multiple sensing features 220a, 220b, 220c, as shown in both FIGS. 4 and 5. According to one embodiment, flange 218 includes a base 222 and a body 223 extending downwardly from the base (see FIG. 5). The base 222 extends circumferentially outwardly farther than the body 223 so that it may overlap a region around opening 205 when the level sender 202 is assembled into tank 200.

Body 223 may be circular and is sized to fit within the opening 205. In addition, the body 223 comprises a chamber 225 between base 222 and a bottom side 227 of the flange 218. The chamber 225 is sized to carry a sensor device or circuit card assembly (CCA) 254.

Sensor device 254 includes a board 276 carrying three pressure sensors 277a, 277b, 277c, a processor 278, and memory 280, according to one embodiment. The board 276 may be a printed circuit board (PCB) or any other suitable device for carrying the sensors 277a, 277b, 277c, processor 278, and memory 280 and providing electrical connections therebetween. Further, processor 278 may be coupled to a harness 284 which is further coupled to a suitable downstream ECU (e.g., for communicating via CAN, PWM, etc.). Other features of the board 276, processor 278, and memory 280 may be similar to those devices discussed above, and will not be re-described here. At least a portion of the board 276 may have a conformal coating protecting it from corrosive fluids within the tank 200; non-limiting examples include diX C Parylene coating, diX N Parylene coating, Humiseal 1A27 conformal coating, and Humiseal 1A33 conformal coating. According to one embodiment, the board 276 is coated in region(s) that carry the three pressure sensors 277a, 277b, 277c.

Pressure sensors 277a, 277b, 277c may be any suitable pressure sensing device. According to one implementation, each of the pressure sensors 277a, 277b, 277c may be a high-resolution piezo-resistive micro-electro-mechanical system (MEMS) device. One suitable commercial implementation is the LPS331AP series by STMicroelectronics. This series is suitable for vehicle tank applications where measurements of between 260-1260 milli-bar (mbar) of absolute barometric pressure are typical; further, this series includes a high-resolution mode (e.g., 0.020 mbar RMS) to enable greater level sensing accuracy. Further, pressure sensors 277a, 277b, 277c may have a serial data interface and a power interface coupled to processor 278 (similar to the interfaces described above with respect to sensor 174). In addition, the serial data interface may communicate according to an SPI protocol, an I²C protocol, or any other suitable protocol.

Sensing features 220a, 220b, 220c extend from the board 276 and through the bottom side 227 of the flange body 223. According to one embodiment, tubes 220a, 220b, 220c may be formed in the same piece of material as the flange 218. For example, in one implementation, feature 220a is a primary or main tube having a first end 279a coupled to a downward-facing surface 281 of board 276 (see FIG. 5). The tube extends downwardly into a bottom region 283 of tank 200—more specifically the first compartment 208a (see FIG. 4). A second end 285a of tube 220a is located at a predetermined distance ($d_1$) from a bottom wall 287 of tank 200. In this same implementation, feature 220b is a reference tube having a first end 279b coupled to surface 281 of board 276 (see FIG. 5); and extending downwardly into the bottom region 283 of the first compartment 208a (see FIG. 4) to a second end 285b at predetermined distance ($d_2$) from the bottom wall 287 of tank 200, where distance ($d_2$) may be different from ($d_1$). And continuing with the same implementation, feature 220c is a correction tube having a first end 279c coupled to surface 281 of board 276 (see FIG. 5) and the tube 220c extends downwardly to a second end 285c which terminates within the upper region 207 of the tank 200 (FIGS. 4-5). Thus, sensing features 220a and 220b are configured generally to be submerged in fuel, while sensing feature 220c is configured generally to be located above the surface of the fuel level, such as in a vapor dome area near the top of the fuel tank.

As best shown in FIG. 5, the first ends 279a, 279b, 279c of the sensing features 220a, 220b, 220c extend into the chamber 225 and circumferentially surround pressure sensors 277a, 277b, 277c, respectively. Each of the first ends 279a, 279b, 279c is engaged with and sealed to the board 276 so that pressure measurements received from sensors 277a, 277b, 277c are associated only with pressures within the respective tubes. It should be appreciated that during use, air and/or fuel vapor will apply pressure to sensors 277a, 277b, 277c. For example, sensor 277c is within the vapor dome; thus, pressure of the vapor dome is measured at sensor 277c. As for sensors 277a, 277b, an air/vapor bubble or region will be trapped within each of sensing features 220a and 220b. And liquid fuel in the bottom region 283 of tank 200 will apply pressure to each of the respective air/vapor bubbles; of course, when ($d_1$) is differs from ($d_2$), the applied pressures will be correspondingly different as well. Thus, sensors 277a, 277b, 277c are not immersed in fuel; they are above the fuel level surface.

Processor 278 may be configured to receive electrical outputs (e.g., current or voltage) of the pressure sensors 277a, 277b, 277c and determine a fuel level in tank 200. While a fuel level can be determined using only sensors 277a and 277b, as will be explained below, using pressure sensors 277a, 277b, and 277c, a more accurate fuel level may be determined.

The values of distances $d_1$, $d_2$ (or at least the difference $|d_1-d_2|$) may be stored in memory 280, and processor 278 may be pre-configured to calculate Equations 1 and 2 below. $P_{PRIMARY}$, $P_{REF}$, and $P_{VAP}$ are electrical outputs (representing measured pressure values) that may be received from pressure sensors 277a, 277b, 277c, respectively. And fuel level ($L_{MS}$) is a value that may be associated with fuel level in tank 200 (specifically, in compartment 208a). By way of example only, memory 280 may have a look-up table of different ($L_{MS}$) values which represent a range of fuel tank levels (e.g., a ¼ tank, a ½ tank of fuel, etc.). Any number of ($L_{MS}$) values are possible.

Equation 1—Scale Factor $$\text{Scale }(S)=\Delta d/|P_{PRIMARY}-P_{REF}|, \text{ where } \Delta d=|d_1-d_2|$$

Equation 2—Fuel Level (Main-side Compartment 208a)

$$\text{Fuel Level }(L_{MS})=(P_{PRIMARY}-P_{VAP})*S$$

A $P_{REF}$ value is used with a $P_{PRIMARY}$ value in order to account for variances in fuel density; e.g., it is a scaling factor. It will be appreciated that fuel density may vary depending on tank temperature, tank pressure, and fuel composition. It also should be appreciated that processor 278 could estimate a fuel level without a $P_{VAP}$ value—e.g., Equation 2 could read Fuel Level $(L_{MS})=P_{PRIMARY}*S$; however, this would not account for changes in fuel vapor pressure. It will be appreciated that accounting for fuel vapor pressure and changes thereto is desirable in vehicle applications since temperature changes can affect vapor pressure within tank 200 (e.g., from heat dissipating components within the tank 200 or without the tank such as a vehicle exhaust system). According to Equation 2, processor 278 accounts for $P_{VAP}$; therefore, level sender 202 provides a more accurate measurement based on the pressure of the vapor above the fuel level surface.

After processor 278 determines a fuel level, the processor can provide this level to a downstream component (e.g., an ECU or other fuel gauge electronics) via harness 284. It should be appreciated that level sender 202 operates without moving components—which is desirable in vehicle environments where shock and vibration can prematurely wear moving components. In addition, level sender 202 may be affected less by tank slosh or tilt. For example, wave motion of the liquid fuel may be dampened within the sensing features 220a, 220b.

Other embodiments of level sender 202 also exist. For example, an accurate fuel level may be determined in the sub-side compartment 208b as well. In this embodiment, a fourth pressure sensor 277d is electrically coupled to and carried by board 276 (FIG. 5), and a first end 279d of a fourth sensing feature (a slave tube) 220d may extend from the board 276 to the lower region 283 of tank 200 in compartment 208b (FIG. 4). A second end 285d of feature 220d may be spaced from the bottom wall 287 by distance ($d_1$). Accordingly, processor 278 may determine a fuel level ($L_{SS}$) of the sub-side compartment 208b using Equations 1 and 3, where $P_{SLAVE}$ is an electrical output (representing a measured pressure value) that may be received from pressure sensor 277d.

Equation 3—Fuel Level (Sub-Side Compartment 208b)

$$\text{Fuel Level } (L_{SS})=(P_{SLAVE}-P_{VAP})*S$$

Thus, there has been disclosed a liquid level sender for a tank. While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A level sender for a tank, comprising:
a sensor device comprising:
   a board located in an upper region of the tank;
   a primary pressure sensor;
   a reference pressure sensor; and
   a correction pressure sensor;
   wherein the board carries the primary, reference and correction pressure sensors;
a primary tube that at least partially encloses the primary pressure sensor and that is configured to extend from the upper region of the tank to a lower region of the tank;
a reference tube that at least partially encloses the reference pressure sensor and that is configured to extend from the upper region to the lower region; and
a correction tube that at least partially encloses the correction pressure sensor, wherein the correction tube is configured to at least partially enclose the correction pressure sensor in the upper region of the tank, and wherein the sensor device further comprises a processor that is coupled to the primary, reference, and correction pressure sensors and is configured to determine a level of liquid within the tank based on pressure measurements within the primary, reference, and correction tubes.

2. The level sender of claim 1, wherein the primary, reference, and correction pressure sensors are micro-electro-mechanical system (MEMS) sensors.

3. The level sender of claim 1, wherein the primary and reference tubes are configured to extend into a first compartment of the tank.

4. The level sender of claim 3, wherein the sensor device further comprises a slave pressure sensor and the level sender further comprises a slave tube that at least partially encloses the slave pressure sensor.

5. The level sender of claim 4, wherein the slave tube is configured to extend from the upper region to the lower region of a second compartment of the tank.

6. The level sender of claim 5, wherein the processor is configured to determine a level of liquid in the second compartment based pressure measurements of the primary, reference, correction, and slave pressure sensors.

7. The level sender of claim 4, wherein the slave pressure sensor is a micro-electro-mechanical system (MEMS) sensor.

8. The level sender of claim 1, further comprising a mount configured for coupling to the tank, and wherein the sensor device is carried by the mount.

9. An apparatus for carrying liquid, comprising:
a tank for carrying the liquid; and
a level sender operatively coupled to the tank, the level sender comprising:
   a sensor device comprising:
      a board located in an upper region of the tank;
      a primary pressure sensor;
      a reference pressure sensor; and
      a correction pressure sensor,
      wherein the board carries the primary, reference and correction pressure sensors;
   a primary tube that at least partially encloses the primary pressure sensor and that extends from the upper region of the tank to a lower region of the tank;
   a reference tube that at least partially encloses the reference pressure sensor and that extends from the upper region to the lower region; and
   a correction tube that at least partially encloses the correction pressure sensor in the upper region of the tank, and wherein the sensor device further comprises a processor that is coupled to the primary, reference, and correction pressure sensors and that is configured to determine a level of liquid within the tank based on pressure measurements within the primary, reference, and correction tubes.

10. The apparatus of claim 9, wherein the primary, reference, and correction pressure sensors are micro-electro-mechanical system (MEMS) sensors.

11. The apparatus of claim 9, wherein the tank has a first compartment and a second compartment that is in fluid communication with the first compartment.

12. The apparatus of claim 11, wherein the primary and reference tubes extend into the first compartment of the tank.

13. The apparatus of claim 12, wherein the sensor device further comprises a slave pressure sensor and the level sender further comprises a slave tube that at least partially encloses the slave pressure sensor.

14. The apparatus of claim 13, wherein the slave tube extends from the upper region to the lower region of the second compartment of the tank.

15. The apparatus of claim 14, wherein the processor is configured to determine a level of liquid in the second compartment based pressure measurements of the primary, reference, correction, and slave pressure sensors.

16. The apparatus of claim 13, wherein the slave pressure sensor is a micro-electro-mechanical system (MEMS) sensor.

17. The apparatus of claim 9, further comprising a mount that is coupled to the tank, and wherein the sensor device is carried by the mount.

18. A level sender for a tank, comprising:
 a sensor device comprising:
  a board located in an upper region of the tank;
  a primary pressure sensor;
  a reference pressure sensor; and
  a correction pressure sensor,
   wherein the board carries the primary, reference and correction pressure sensors;
  a primary tube that at least partially encloses the primary pressure sensor and that is configured to extend from the upper region of the tank to a lower region of the tank;
  a reference tube that at least partially encloses the reference pressure sensor and that is configured to extend from the upper region to the lower region; and
  a correction tube that at least partially encloses the correction pressure sensor, wherein the correction tube is configured to at least partially enclose the correction pressure sensor in the upper region of the tank,
 wherein the primary, reference and correction tubes have a first end and the first end is configured to couple to a downward-facing surface of the board in the upper region of the tank, and
 wherein the sensor device further comprises a processor that is coupled to the primary, reference, and correction pressure sensors and is configured to determine a level of liquid within the tank based on pressure measurements within the primary, reference, and correction tubes.

* * * * *